US012689271B2

(12) United States Patent　　　　(10) Patent No.: US 12,689,271 B2
Ponzio et al.　　　　　　　　　　 (45) Date of Patent: Jul. 21, 2026

(54) APPARATUS FOR WINDING POLES OF CORES OF DYNAMO ELECTRIC MACHINES

(71) Applicant: ATOP S.P.A., Florence (IT)

(72) Inventors: Massimo Ponzio, Siena (IT); Giovanni Manuelli, Bagno a Ripoli (IT)

(73) Assignee: ATOP S.P.A., Florence (IT)

( * ) Notice: Subject to any disclaimer, the term of this patent is extended or adjusted under 35 U.S.C. 154(b) by 895 days.

(21) Appl. No.: 17/917,195

(22) PCT Filed: Mar. 29, 2021

(86) PCT No.: PCT/IB2021/052576
§ 371 (c)(1),
(2) Date: Oct. 5, 2022

(87) PCT Pub. No.: WO2021/205279
PCT Pub. Date: Oct. 14, 2021

(65) Prior Publication Data
US 2023/0198357 A1　　Jun. 22, 2023

(30) Foreign Application Priority Data

Apr. 6, 2020　(IT) ........................ 102020000007288

(51) Int. Cl.
*H02K 15/095* (2006.01)
*H01F 41/088* (2016.01)
(Continued)

(52) U.S. Cl.
CPC ............. *H02K 15/095* (2013.01); *H02K 3/12* (2013.01); *H02K 3/28* (2013.01); *H01F 41/088* (2016.01);
(Continued)

(58) Field of Classification Search
CPC ........ H02K 15/09; H02K 15/095; H02K 3/12; H02K 3/28; H02K 15/33; H01F 41/088; Y10T 29/53143
See application file for complete search history.

(56) References Cited

U.S. PATENT DOCUMENTS

2005/0051661 A1 *　3/2005　Faulhammer ........ H02K 15/095
　　　　　　　　　　　　　　　　　　 242/439.1
2013/0200742 A1 *　8/2013　Seki ..................... H02K 15/095
　　　　　　　　　　　　　　　　　　 310/195

FOREIGN PATENT DOCUMENTS

EP　　　　3306784 A1　　4/2018
EP　　　　3624315 A1　　3/2020
(Continued)

OTHER PUBLICATIONS

Stenzel et al, "Impact of the needle winding technology on the operational behavior of an asynchronous machine", 2015 5th International Electric Drives Production Conference (EDPC), Nuremberg, Germany, 2015, pp. 1-8. (Year: 2015).*

*Primary Examiner* — A. Dexter Tugbang
(74) *Attorney, Agent, or Firm* — Maschoff Brennan

(57)　　　　　ABSTRACT

An apparatus for winding coils of a wire conductor around radial poles of a core of a dynamo electric machine component may include a wire dispenser arm which rotates about a radial pole at a time to dispense the wire conductor forming turns. A first wire guide is positioned at a first axial end from the radial pole being wound and moved along a direction parallel to the radial direction of the radial pole to form a coil. A second and third wire guide are positioned respectively, in a first and second slot adjacent to the radial pole at opposite sides to form at least a respective passageway for the wire conductor. The apparatus includes first and second guide portions that extend toward and are coplanar to (Continued)

each other in order to at least partially close each passage-way during winding of the radial pole.

12 Claims, 9 Drawing Sheets

(51) Int. Cl.
  *H02K 3/12*                (2006.01)
  *H02K 3/28*                (2006.01)
  H02K 15/33              (2025.01)
(52) U.S. Cl.
  CPC ......... *H02K 15/33* (2025.01); *Y10T 29/53143*
                                                    (2015.01)

(56)                    References Cited

FOREIGN PATENT DOCUMENTS

JP          H10112962  A       4/1998
JP          2012135077  A      7/2012
JP          2014147165  A   *  8/2014
WO          2013008183  A2     1/2013

* cited by examiner

APPARATUS FOR WINDING POLES OF CORES OF DYNAMO ELECTRIC MACHINES

FIELD OF THE INVENTION

The present invention relates to winding coils of dynamo electric machines. In particular, the solutions of the invention relate to winding poles of cores where the slots for receiving the coils have external openings.

BACKGROUND OF THE INVENTION

As it is known, the turns of the coils of dynamo electric machines are wound by at least a wire dispenser arm capable of delivering wire on the surfaces of wire guide members where the wire runs to reach predetermined positions in the slots. The final winding result requires that the wire of the turns is deposited in the slots according to a predetermined disposition, therefore, not in a random way.

The turns of the coils are positioned during winding according to a required disposition to optimize the quantity of wire conductor that can occupy the available space of the slot. Furthermore, the turns should not cross each other, or be excessively locally deformed to avoid damaging the wire insulation.

The disposition of the turns around a pole provides to progressively wind a series of turns in the radial direction of the core. One turn is wound along the sides and along the axial ends of the pole, which in combination with each other delimit a slot. The succession of turns wound in this manner forms a layer of turns. Within this layer, the turns have a so called "radial stratification". In other words a disposition where the turns are one next to the other in the radial direction of the pole being wound.

To complete the coil further layers are formed. In each further layer the turns are again wound one next to the other in the radial direction of the pole. Each further layer is formed above the layer that has been previously wound, therefore positioning of the successive layers occurs in an angular direction of the core to form the so called "stratification of the layers of the turns"

In the same slot there will be positioned portions of two coils (layers of turns). Each portion of a coil will be wound around a pole that is adjacent to other two poles. Therefore, there are specific portions of the slot space occupied by respective coil portions of coil, and there is a specific part of the slot space which remains empty. This empty part is a delimitation area between the portions of the coils wound in the same slot. The empty portion of the slot is radially aligned with the opening of the slot where the wire passes to enter the slot during winding.

Winding, in this situation, can require connection of the coil leads to termination structures of core, like hooks or other devices, where the wire connector needs to be connected, for example by wrapping or insertion techniques.

Machines and methods for winding poles of cores of dynamo electric machines with the slots which delimit poles provided with external opening are for example described in WO2013/008183. In this case, a wire dispenser arm is provided which rotates about the radial poles for dispensing the wire in such a way to form the wire turns. The wire is fed up to reaching an exit of the wire dispenser arm through a series of devices and, therefore, intercepted by a wire guide group.

As diagrammatically shown in FIG. 1, the wire guide group comprises a first wire guide 32 positioned at the opposite ends A and A' of pole 10c being wound and that, during winding of the pole, moves along a direction 132a, or 132b, parallel to, or coincident with, the radial direction 110c. A second wire guide 36 and a third wire guide 37, for example blade-shaped, are then provided positioned in respective slots 10a and 10b defined at opposite sides of pole 10c being wound and at which are moved during winding for guiding the wire W along the opposite sides L and L' of the pole 10c.

In practice, during a winding cycle, the wire dispenser arm, for example during rotation in the clockwise direction as shown in FIG. 1, and the wire W that is fed by the same is guided by the edge of the second wire guide 32, by the edge of the first wire guide 36 and by the edge of the third wire guide 37, depending on the angular position of the wire dispenser arm to form the turns S around the radial pole 10c being wound.

However, the solution described in WO2013/008183, in particular if the wire has a great thickness, i.e. in the case of wire conductors, can have some drawbacks.

In fact, as diagrammatically shown in FIG. 1, between the first wire guide 32 and the second wire guide 36, as well as between the first wire guide 32 and the third wire guide 37, a respective passageway 38a and 38b for the wire conductor W is present. During a winding cycle, the rotation of the wire dispenser arm causes the passageway of the wire conductor W from the second wire guide 36 to the first wire guide 32, i.e. from a situation where the wire conductor (indicated with W1) is correctly stretched, when is positioned in contact with the edge 36a of the second wire guide 36, to a successive situation where the wire conductor (indicated with W2) leaves the edge 36a of the second wire guide 36 and, in particular due to the great section, loses the correct tensioning degree, bends and, therefore, enters the aforementioned passageway 38a defined between the second wire guide 36 and the first wire guide 32. Therefore, also in the following instant, the wire conductor (indicated with W3) is not correctly stretched, and, therefore, cannot be precisely positioned around the pole 10c being wound. Therefore, the wire conductor W does not position itself in the correct position of the stratification thus producing intersections which compromise also the positioning of the turns S that are wound successively, and therefore the correct stratification of the coil wound around the pole 10c is unavoidably jeopardized.

Other solutions having similar drawbacks are also described in JP2012/135077, EP3306784 and EP3624315.

SUMMARY OF THE INVENTION

It is, therefore, an object of the present invention to provide an apparatus for winding poles of cores of dynamo electric machines that is able to overcome the aforementioned drawbacks of the prior art, and in particular that is able to guarantee that the wire conductor, during winding of the turns of the coils, has a correct tensioning degree and is therefore correctly positioned in the slots using a wire dispenser having a rotating trajectory to feed the winding wire.

It is a further object of the present invention to guarantee that the wire that is wound on the pole of the core is correctly positioned in all the available zones of the slot of the wire turns.

It is also an object of the present invention to guarantee a maximum filling of the slots of the core.

It is a further object of the present invention to provide a winding solution that is rapid in the time necessary for winding the coils of the core.

It is a further object of the present invention to achieve connection of the coil leads to termination structures of the core.

It is also an object of the present invention to provide a method for winding poles of cores of dynamo electric machines which has the same advantages.

These and other objects are achieved by an apparatus for winding a plurality of coils (B) of a wire conductor (W) around respective radial poles of a core of a dynamo electric machine component arranged according to respective radial directions, said coils (B) being formed by a plurality of turns of a wire conductor each of which formed of two opposite longitudinal stretches, wherein each longitudinal stretch is arranged to be deposited in a respective slot, and two stretches of a turn of a wire conductor are each deposited adjacent to a respective first axial end (A) of said radial pole, said apparatus comprising:

a wire dispenser arm arranged to rotate about a radial pole at a time to dispense the wire conductor (W) forming said turns (S) of said wire conductor;

a first wire guide arranged to be selectively positioned at said first axial end (A) of a radial pole at a time and to be moved, during winding, along a moving direction parallel to the radial direction of the radial pole to form a respective coil (B);

a second wire guide arranged to be positioned and moved at a first slot adjacent to the radial pole being wound;

a third wire guide arranged to be positioned and moved at a second slot adjacent to the radial pole being wound, said second wire guide and said third wire guide being positioned with respect to said first wire guide in such a way to form at least a respective passageway for the wire conductor (W);

wherein said primo, said second and said third wire guide are configured to be moved separately from each other; whose main characteristic is to provide, furthermore, at least a first and a second guide portion configured to respectively protrude from the second and the third wire guide towards the first wire guide, that said first and second guide portions are coplanar to each other and that said first and second guide portions are arranged to close, at least partially, the, or each, respective passageway during winding of the radial pole.

Other technical characteristics of the invention are described in the dependent claims which define particular embodiments of the invention.

According to another aspect of the invention, a method for winding a plurality of coils (B) of a wire conductor (W) around respective radial poles of a core of a dynamo electric machine component arranged according to respective radial directions, said coils (B) being formed by a plurality of turns of a wire conductor (S) each of which formed of two opposite longitudinal stretches, wherein each longitudinal stretch of a turn of a wire conductor is positioned in a respective slot, and two stretches of a turn of a wire conductor are each deposited adjacent to a respective axial end (A) of the radial pole; said method comprising the steps of:

forming the turns (S) of a wire conductor (W) of a coil (B) by a wire dispenser arm arranged to rotate about the radial poles to dispense the wire conductor (W);

selectively positioning a first wire guide at a first axial end (A) of a radial pole being wound and moving said first wire guide along a radial direction of said radial pole being wound;

positioning and moving a second wire guide in a first slot adjacent to the radial pole being wound;

positioning and moving a third wire guide in a second slot adjacent to the pole being wound, said second wire guide and said third wire guide being positioned with respect to said first wire guide in such a way to form at least a respective passageway for said wire conductor;

wherein said primo, said second and said third wire guide are configured to be moved separately from each other; whose main characteristic is that a step is, furthermore, provide for closing at least partially, said, or each, respective passageway during winding of said radial pole by at least a first and a second guide portion coplanar to each other and arranged to respectively protrude from the second and the third wire guide towards said first wire guide.

BRIEF DESCRIPTION OF THE DRAWINGS

The invention will be now illustrated with the following description of an exemplary embodiment thereof, exemplifying but not limitative, with reference to the attached drawings wherein.

Figure 1:
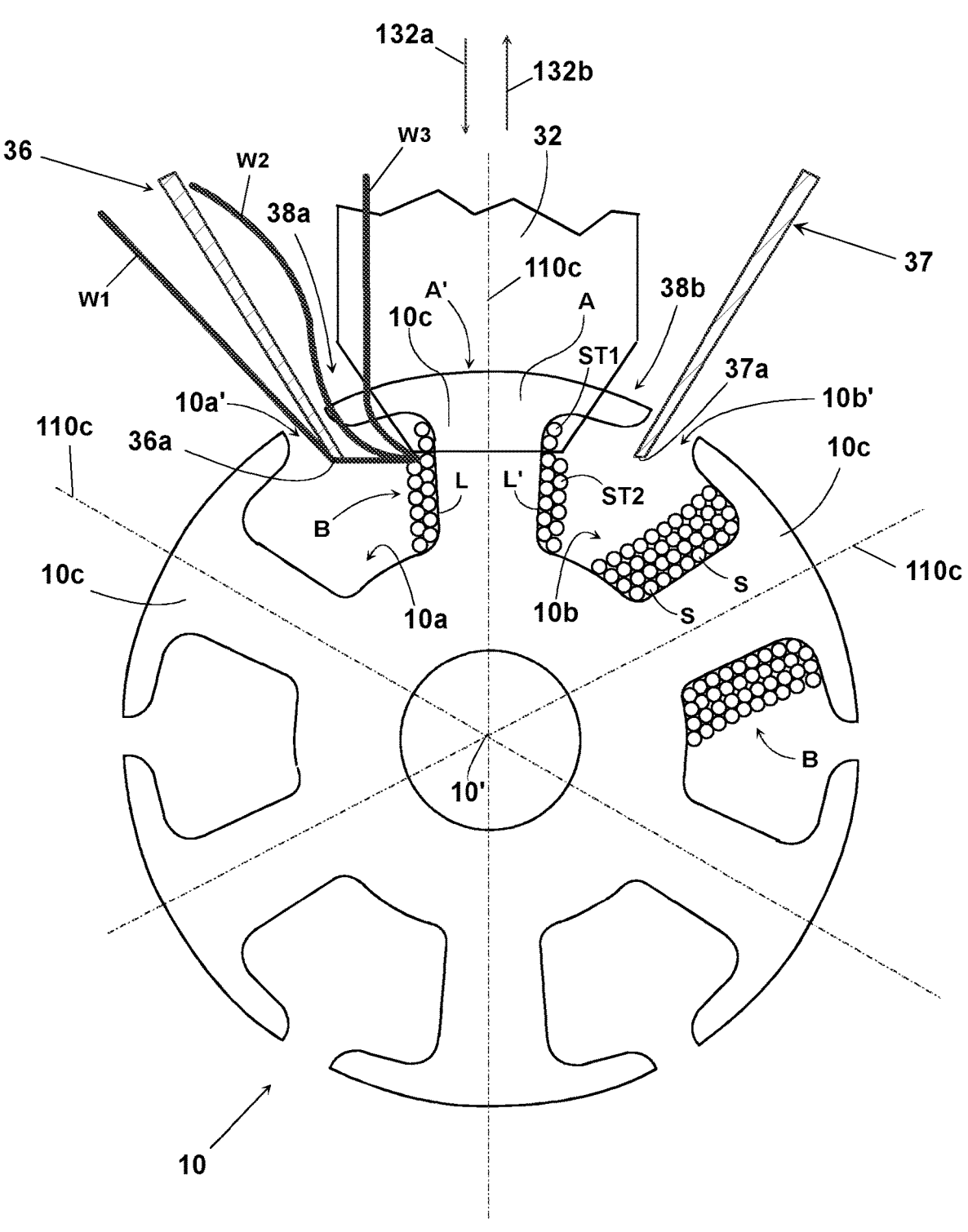
FIG. 1 diagrammatically shows a prior art solution to highlight the technical problem solved by the present invention.
Figure 2:
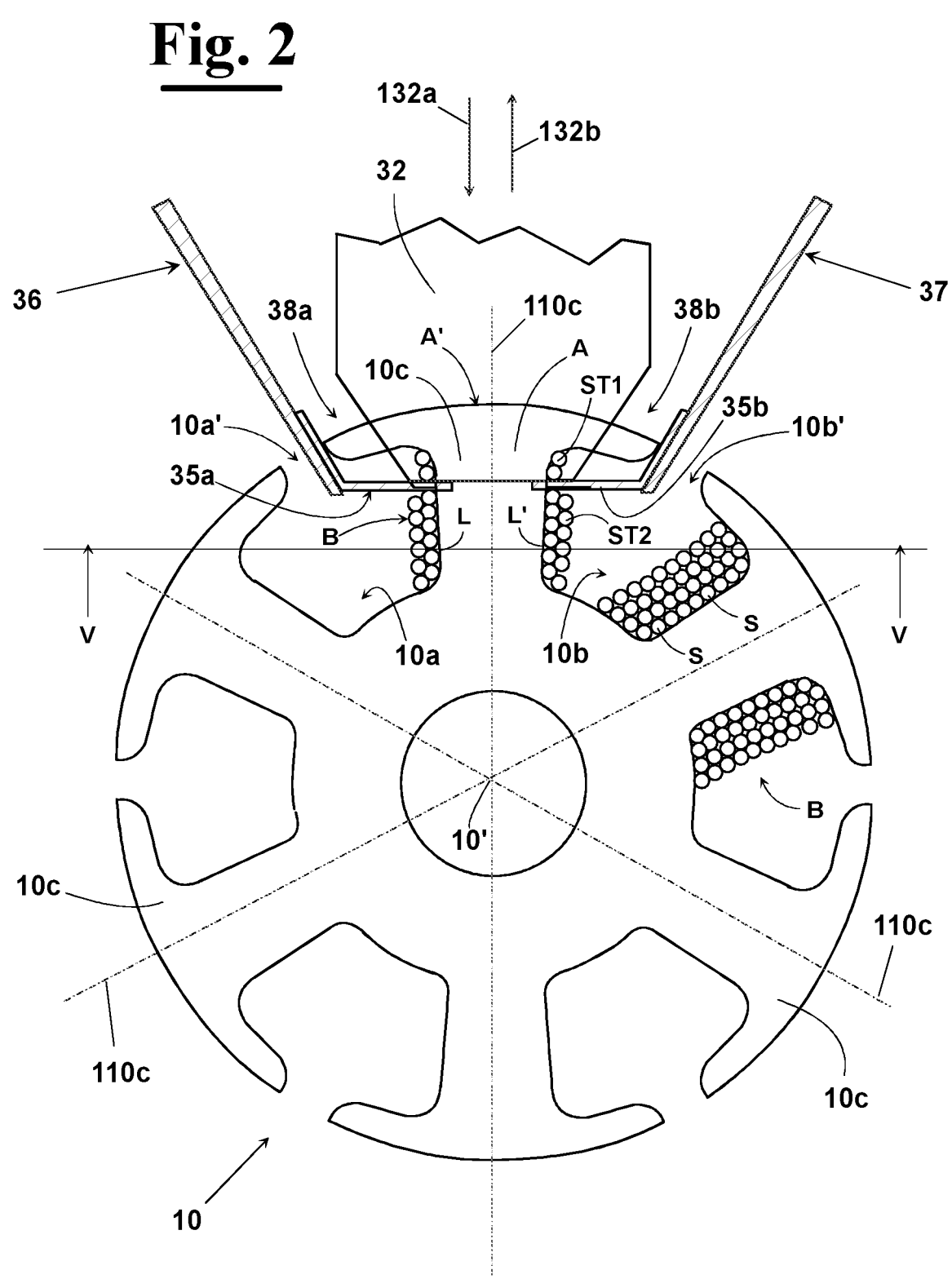
FIG. 2 diagrammatically shows a plant view of some components of a first embodiment of an apparatus, according to the invention, for winding poles of cores of dynamo electric machines.
Figure 3:
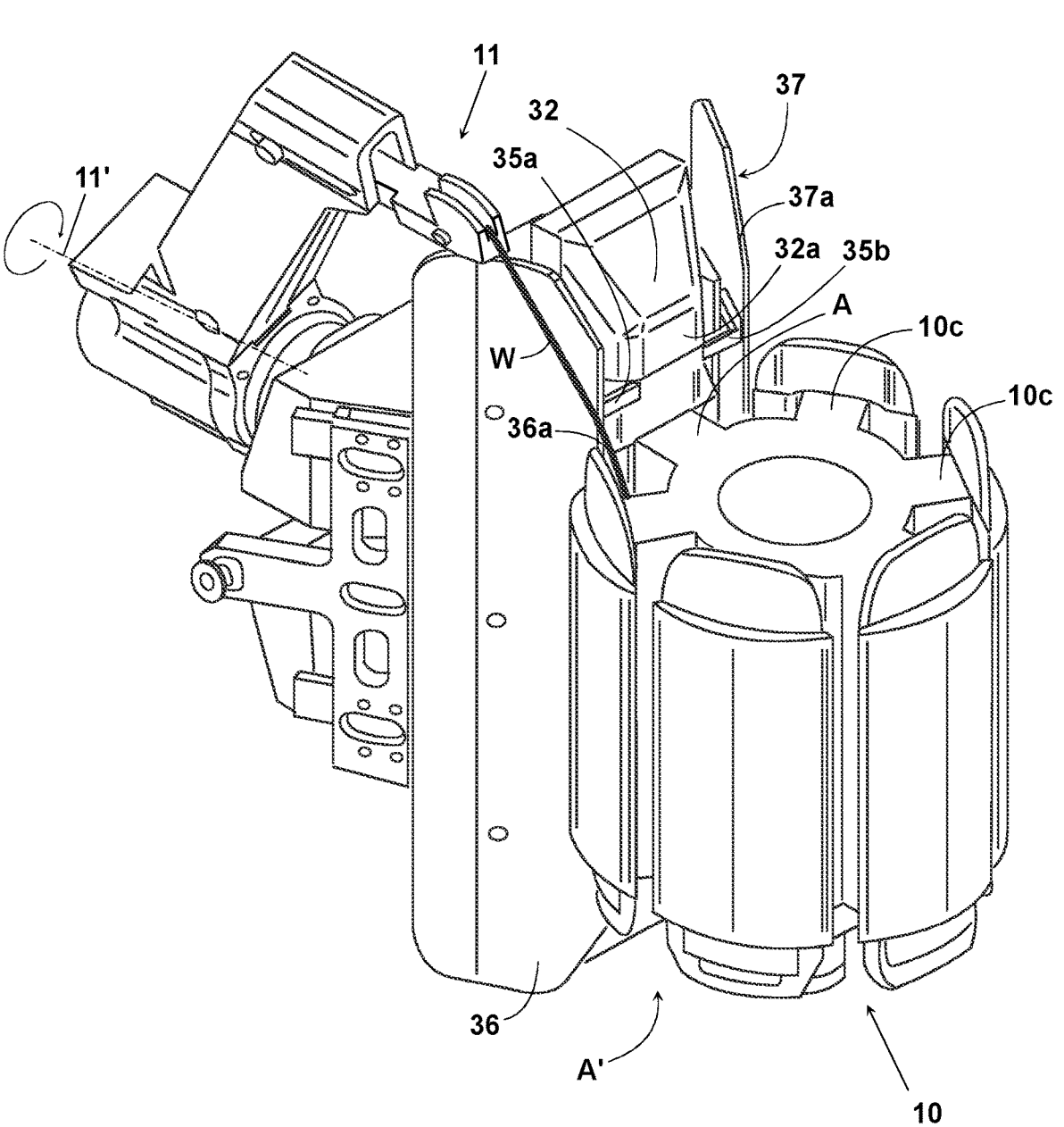
FIG. 3 diagrammatically shows a perspective side elevation view of the apparatus of FIG. 2.
Figure 4:
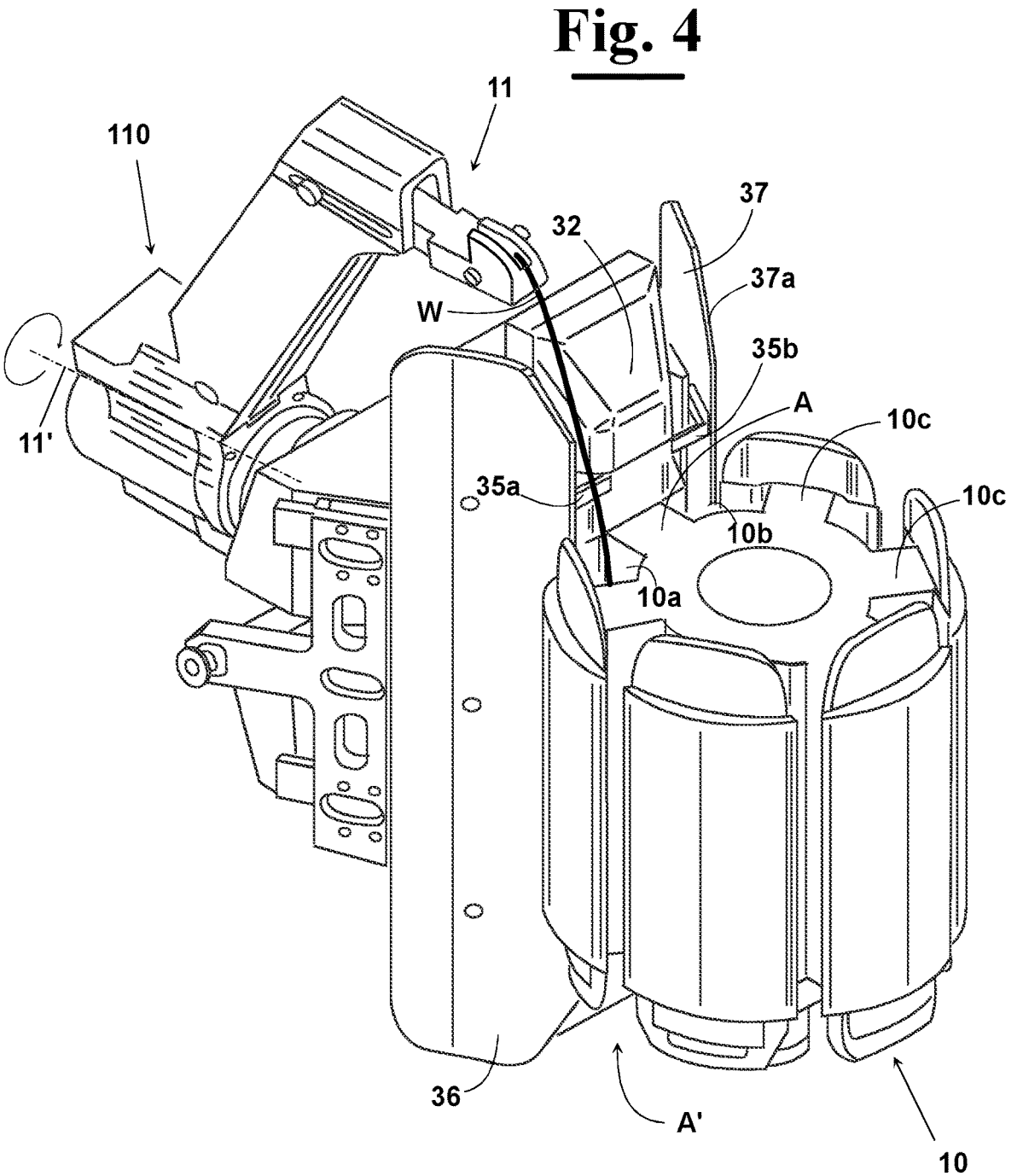
FIG. 4 diagrammatically shows a perspective side elevation view of the apparatus of FIG. 2 in an instant following the instant of FIG. 3.
Figures 6A, 6B:
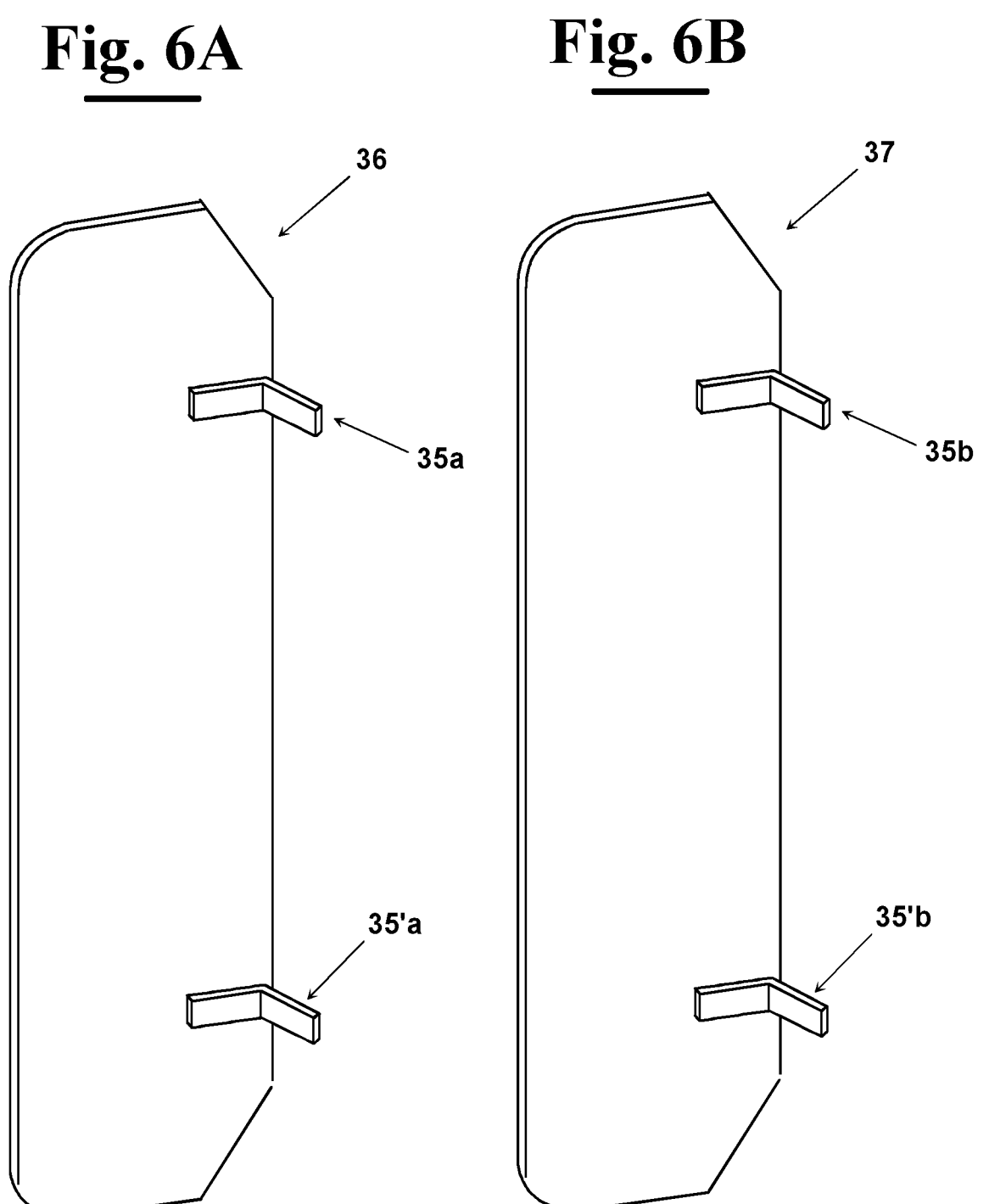

FIGS. from 5A to 5D show a section according to arrows V-V of FIG. 2 in a possible succession of following instants of the winding of a pole using the apparatus for winding poles of cores of dynamo electric machines of FIGS. 3 and 4;

FIGS. 6A and 6B diagrammatically shows a perspective side elevation view of a possible embodiment according to the invention, respectively, of the second and the third wire guide.

DETAILED DESCRIPTION OF SOME EXEMPLARY EMBODIMENTS OF THE INVENTION

As diagrammatically shown in FIG. 2, a core 10 of a dynamo electric machine comprises a determined number of radial poles 10c each of which oriented along a respective radial direction 110c. Each radial pole 10c is laterally delimited by two slots 10a and 10b defined at the opposite sides of the radial pole 10c. More precisely, the slots 10a and 10b have respective openings 10a' and 10b' facing towards the outside, if considered in their orientation with respect to the central axis 10' of the core 10.

The turns S that are wound around the radial pole 10c being wound are shown in section and diagrammatically illustrated with a circle. As known, the turns S of the coils B of wire W are wound in the slots 10a and 10b according to a desired disposition.

In particular, as shown in detail in FIG. 2, a first stretch of a turn of layer ST1 of the B is positioned against a longitudinal side L and against the axial ends A of the radial poles 10c which delimit the slots 10a and 10b. The second and the successive layers of turns ST2 are progressively superimposed on the first layer of turns ST1, as diagrammatically shown in FIG. 2.

With reference to FIGS. from 2 to 4, the apparatus 1, according to the invention, comprises a wire dispenser arm 11. This is moved by a displacement device 110 which will not be described here in detail, as well as the devices for feeding the wire conductor W up to reaching the exit of the wire dispenser arm 11, because these are known to the skilled person in the art and anyway, for example, described in detail in WO2013/008183 in the name of the same Applicant.

The apparatus 1 comprises, furthermore, a first guide member 32, or wire guide, which in FIG. 2 has been made transparent in order to show the radial pole 10c being wound. More in particular, the first wire guide 32 is selectively positioned at a first axial end A of a radial pole 10c at a time and, therefore, moved, during winding of the radial pole 10c, along a moving direction 132a, or an opposite moving direction 132b, but anyway parallel, preferably coincident, to the radial direction 110c of the radial pole 10c, in such a way to form a respective coil B.

With particular reference to the FIGS. from 2 to 4, the apparatus 1 comprises, furthermore, a second wire guide 36 and a third wire guide 37.

In particular, the first, second and third wire guide 32, 36 and 37 are configured to be moved separately from each other.

More in particular, the second wire guide 36 is positioned in the first slot 10a and moved along a respective moving direction forming a predetermined angle with the radial direction 110c of the pole 10c being wound, and preferably radially oriented with respect to core 10, at the aforementioned first slot 10a to guide the wire conductor W in the desired direction along the side L. The third wire guide 37 is positioned in the second slot 10b and moved along a respective moving direction forming a predetermined angle with the radial direction 110c of the pole 10c being wound, and preferably radially oriented with respect to core 10, at the aforementioned second slot 10b to guide the wire conductor W in the desired position along the side L'.

As shown for example in the FIGS. 3 and 4, the second and third wire guides 36 and 37 can be blade-shaped, and extend for a length longer than sides L and L' of the radial pole 10c. The second and the third wire guide 36 and 37 can be, for example, slidingly mounted on respective slides not shown in the figure for simplicity, but anyway also these described for example in WO2013/008183.

More in particular, as diagrammatically shown in FIG. 2, the second and the third wire guide 36 and 37 are positioned, in particular distanced from each other, with respect to the first wire guide 32, therefore respective passageways 38a and 38b for wire conductor W are defined between the first wire guide 32 and the second wire guide 36, and between the first wire guide 32 and the third wire guide 37. The possibility is, however, also provided that only one passageway 38a, or 38b, for the wire conductor W is formed between the second, or the third, wire guide 36, or 37, and the first wire guide 32. According to the present invention, at least a first and a second guide portion 35a and 35b are provided configured to respectively protrude from the second and the third wire guide 36, and 37 towards the first wire guide 32. In particular, as clearly shown, for example, in FIG. 2, the first and the second guide portions 35a and 35b are coplanar to each other. More in particular, the first and the second guide portion 35a and 35b are arranged to close, at least partially, the, or each, respective passageway 38a, or 38b, during winding of the radial pole 10c. In this way, the aforementioned technical problem of the prior art solutions is solved, because the wire conductor W cannot withdraw and be positioned in the passageway 38a, or 38b, during the moving from the edge 36a of the second wire guide 36 to the edge 32a of the first wire guide 32, or from this to the edge 37a of the third wire guide 37, due to the presence of the aforementioned first and second guide portions 35a and 35b. Therefore, the technical solution adopted avoids that the wire conductor W loses the correct tensioning and guarantees that it can correctly form turn S. Therefore, the present invention guarantees to form the coils B with a high precision also in the case of wire conductors W having a high transverse section.

In the embodiment that is shown as an example in FIG. 2, first guide portions 35a and 35b are provided protruding, respectively, from the second wire guide 36 and the third wire guide 37 and oriented towards the first wire guide 32 along a direction substantially orthogonal to the aforementioned radial direction 110c of the radial pole being wound. More in particular, the guide portions 35a protruding from the second wire guide 36 and oriented towards the first wire guide 32 closes at least partially the passageway 38a at a first side L of the radial pole 10c being wound, whilst the guide portions 35b protruding from the third wire guide 37 and oriented towards the first wire guide 32 closes the passageway 38b at the side L' opposite to the side L of the radial pole 10c being wound.

With reference, now, to the FIGS. 3 and 4, where two successive instants are diagrammatically shown of the winding cycle of the radial pole 10c for forming the turns S of the coils B, not shown for simplicity, it can be seen that the wire conductor W, exiting the dispenser 11 rotating in the clockwise direction C around axis 11' meets, in the instant shown in FIG. 3, the second wire guide 36 and then slides along the same and reaches the edge 36a. Going on with the rotation of the wire dispenser arm 11, the instant shown in FIG. 4 is reached, where the wire conductor W moves from the edge 36a to the guide portions 35a. Then, the wire conductor W will move on the edge 32a of the first wire guide 32 for positioning, then, on the pole 10c being wound. The successive rotation of the wire dispenser arm 11 causes the wire conductor W to be positioned on the second guide portions 35b and, therefore, to slide on the edge 37a of the third wire guide 37.

The alignment of the edges 36a and 37a of the second and the third wire guide 36 and 37 with the position of the slots 10a and 10b of the pole 10c where the wire W has to be positioned guarantees the minimum bending of the wire conductor W and the minimum variation of tensioning of the wire conductor W in the step of forming a turn S. At the same time, the contemporary alignment of the edges wire guide 36a, 37a and 32a among each other and with the pole 10c guarantees to correctly form the turns S. When the number of the layers ST increases, the formation of the turns S is very close to the zone of the slots 10a and 10b occupied by the encumbrance of the wire guide 36 and 37. In this situation the edges 36a and 37a deposit the wire conductor W directly on the turns S that are already formed, because these are adjacent to the edges 36a and 37b. Therefore, it is particularly important to precisely move the edges 36a and 37a along the pole 10c in such a way that the deposition occurs with the turns adjacent to each other and not superimposed.

As shown in detail in the section views according to the arrows V-V of FIG. 2 of FIGS. from 5A to 5D, in a possible embodiment, a fourth wire guide 32' can be, advantageously, provided. This is positioned at a second axial end A' of the pole 10c being wound, opposite to the aforementioned first axial end A at which the first wire guide 32 is positioned. The fourth wire guide 32', during winding, is moved along the aforementioned moving directions 132a and 132b parallel to, preferably coincident to, the radial direction 110c of the pole being wound. In particular, the fourth wire guide 32' can be configured to move separately from the first, the second, and the third wire guides 32, 36 and 37.

At this regard it should be specified that the first and the fourth wire guide 32 and 32' can be two halves of the same wire guide, or, alternatively, according to an alternative embodiment, can be two distinct bodies which, advantageously, move symmetrically and in synchronized way, preferably separately from each other, at two opposite ends A and A' of the same pole being wound 10c.

Figure 5A:
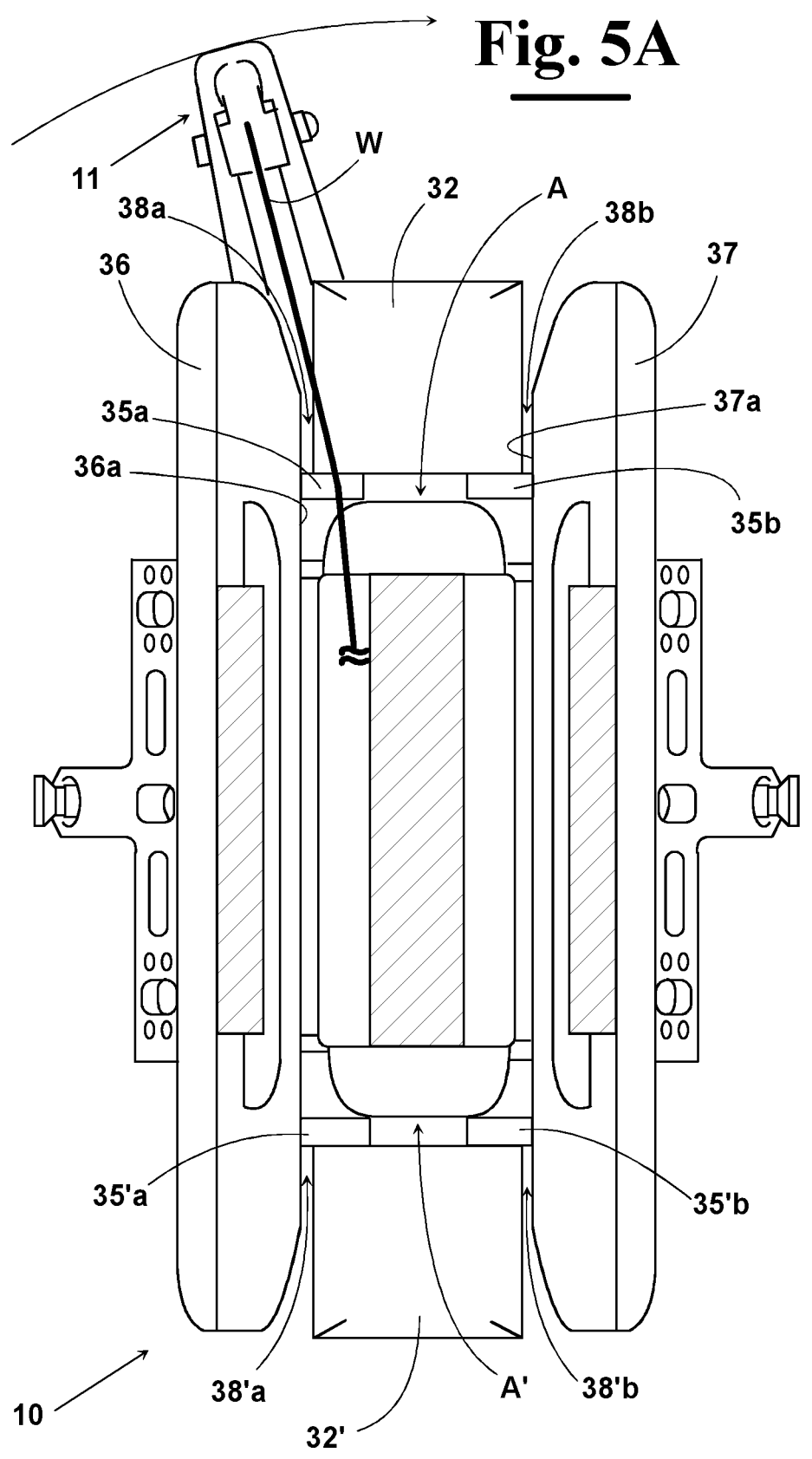
Figure 5B:
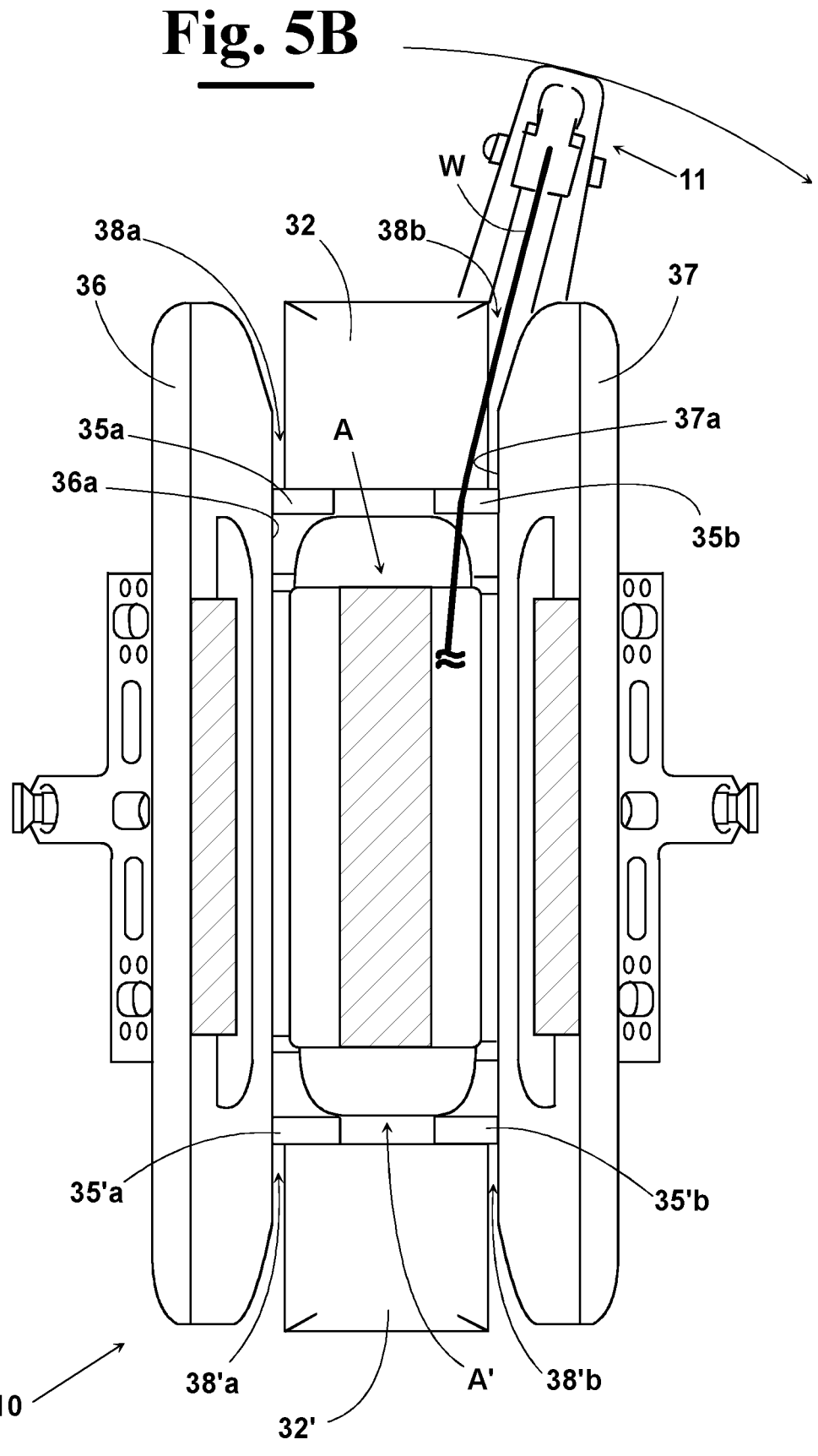
Figure 5C:
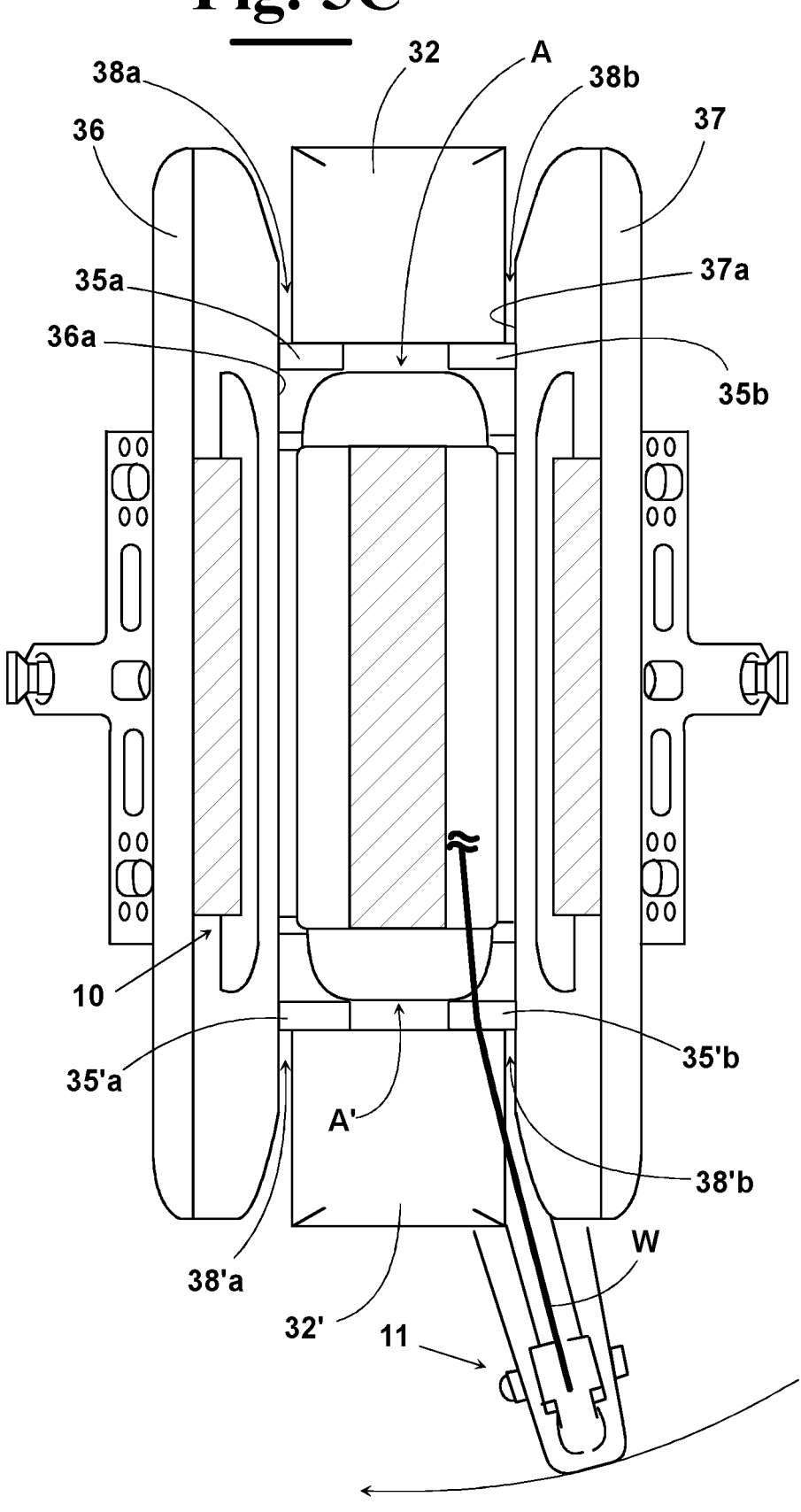
Figure 5D:
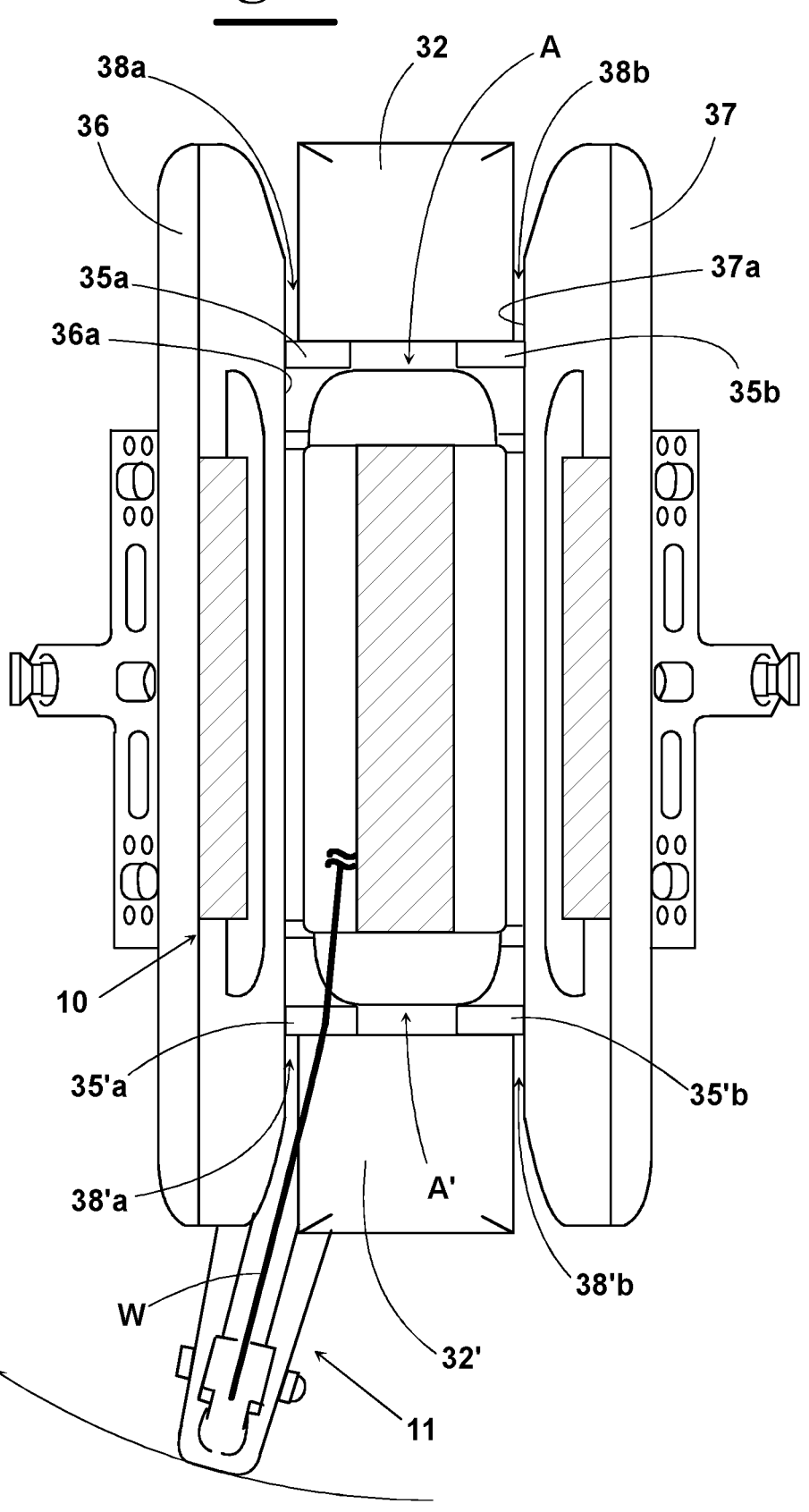

As shown in the FIGS. from 5A to 5D, in which the turns S are not shown for simplicity, in addition to the first guide portions 35a and 35b protruding, respectively, from the second and the third wire guide 36, and 37 towards the first wire guide 32, and arranged to close, at least partially, the aforementioned first passageways 38a and 38b, defined, respectively, between the first wire guide 32 and the second wire guide 36, and between the first wire guide 32 and the third wire guide 37 (see FIGS. 5A and 5B) second guide portions 35'a and 35'b are provided, advantageously, coplanar to each other, protruding, respectively, from the second wire guide 36 and the third wire guide 37 towards the aforementioned fourth wire guide 32'. More precisely, each of the second guide portions 35'a and 35'b closes, at least partially, a respective second passageway 38'a and 38'b defined, respectively, between the fourth wire guide 32' and the second wire guide 37 and between the fourth wire guide 32' and the third wire guide 37 (see FIGS. 5C and 5D).

As shown in the FIGS. 6A and 6B, each guide portion 35a, 35'a, 35b and 35'b can be substantially a bracket fixed, for example by screws, in a predetermined position of a respective wire guide 36, and 37.

It should be specified that, as the skilled person in the art will have no difficulty to understand, even though in the FIGS. from 2 to 6B embodiments of the inventions are diagrammatically shown where the first guide portions 35a, 35b, and the second guide portions 35'a and 35'b protrude, respectively, from the second and the third wire guide 36 and 37, the possibility is also provided that the guide portions 35a and 35b, and/or the guide portions 35'a and 35'b can protrude from only one between the second and the third wire guide 36 and 37. In another alternative embodiment that is not shown, the guide portions 35a and 35b can protrude from the first wire guide 32 to close, at least partially, the, or each passageway 38a, 38b at the first axial end A. Analogously, another guide portion 35'a can be provided, advantageously at least other two guide portions 35'a and 35'b, protruding from the fourth wire guide 32' to close, at least partially, the, or each passageway 38'a, 38'b at the second axial end A'. In other alternative embodiments, not shown for simplicity the, or each, guide portions 35a and/or 35b that is provided can be a portion protruding from a guide member different from the first, the second, the third and the fourth wire guide 32, 36, 37 and 32', but anyway configured to close, at least partially, a respective passageway 38a, 38b, 38'a, and 38'b defined between these as described above and shown in the FIGS. from 2 to 6B.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. An apparatus (1) for winding a plurality of coils (B) of a wire conductor (W) around respective radial poles (10c) of a core (10) of a dynamo electric machine component arranged according to respective radial directions (110c), the coils (B) being formed by a plurality of turns (S) of the wire conductor (W), each of the plurality of turns (S) comprising two opposite longitudinal stretches, each of the two opposite longitudinal stretches being positioned in a respective slot (10a, 10b), and the two opposite longitudinal stretches of each of the turns being positioned adjacent to respective axial ends (A, A') of the radial pole (10c), the apparatus (1) comprising:

a wire dispenser arm (11) configured to rotate about one of the radial poles (10c) at a time to dispense the wire conductor (W) forming the turns (S);

a first wire guide (32) configured to be selectively positioned at a first axial end (A) of the radial pole (10c) and to move, during winding, along a moving direction (132a, 132b) parallel to the radial direction (110c) of the radial pole (10c) to assist in forming the respective coil (B);

a second wire guide (36) configured to be positioned and moved at a first slot (10a) adjacent to the radial pole (10c) undergoing winding;

a third wire guide (37) configured to be positioned and moved at a second slot (10b) adjacent to the radial pole (10c) undergoing winding, wherein the second wire guide (36) and the third wire guide (37) are arranged relative to the first wire guide (32) to define at least one respective passageway (38a, 38b, 38'a, 38'b) through which the wire conductor (W) passes during winding;

wherein the first, second and third wire guides (32, 36, 37) are each configured to move independently of one another; and wherein the second wire guide (36) includes at least one first guide portion (35a, 35b), and the third wire guide (37) includes at least one second guide portion (35'a, 35'b), each of the first and second guide portions being configured to protrude toward the first wire guide (32), the first and second guide portions (35a, 35b, 35'a, 35'b) include portions that each extend toward and are coplanar with one another, partially overlapping the radial pole (10c) when viewed in an axial direction, and being configured to at least partially close the respective passageway (38a, 38b, 38'a, 38'b) during winding of the radial pole (10c), such that the wire conductor (W) is prevented from withdrawing into the the respective passageway (38a, 38b) when moving from an edge (36a) of the second wire guide (36) to an edge (32a) of the first wire guide (32), or from the edge (32*a*) of the first wire guide (32) to an edge (37*a*) of the third wire guide (37), due to a presence of the first and second guide portions (35*a*, 35*b*, 35'*a*, 35'*b*).

2. The apparatus according to claim 1, wherein the first and second guide portions (35*a*, 35*b*, 35'*a*, 35'*b*) extend from at least one of the second and third wire guides (36, 37) towards the first wire guide (32).

3. The apparatus according to claim 1, wherein the first and second guide portions (35*a*, 35*b*, 35'*a*, 35'*b*) extend from at least one of the second and third wire guides (36, 37) in a direction substantially orthogonal to the radial direction (110*c*) of the radial pole (10*c*).

4. The apparatus according to claim 1, wherein the at least one respective passageway forms first passageways, wherein first guide portions (35*a*, 35*b*) extend from the second wire guide (36) and the third wire guide (37), respectively, and are arranged to at least partially close the respective first passageways (38*a*, 38*b*) between the first wire guide (32) and the second wire guide (36), and between the first wire guide (32) and the third wire guide (37), on opposite sides (L, L') of the radial pole (10*c*).

5. The apparatus according to claim 1, wherein the least one first guide portion (35*a*, 35*b*) extends from at least one of the second and third wire guides (36, 37) and at least partially closes a first passageway (38*a*, 38*b*) of the at least one respective passageway between the first wire guide (32) and the second wire guide (36), or between the first wire guide (32) and the third wire guide (37), wherein a fourth wire guide (32') is provided, configured to be selectively positioned at a second axial end (A') of the radial pole (10*c*), opposite a first axial end (A) of the radial pole, and movable during winding along a moving direction (132*a*, 132*b*) parallel to the radial direction (110*c*) of said radial pole (10*c*) to form the coil (B), and wherein at least one second guide portion (35'*a*, 35'*b*) extends from at least one of the second and third wire guides (36, 37) and at least partially closes a second passageway (38'*a*, 38'*b*) of the at least one passageway between the fourth wire guide (32') and the second wire guide (36), or between the fourth wire guide (32') and the third wire guide (37).

6. The apparatus according to claim 4, wherein first guide portions (35*a*, 35*b*) extend from the second and third wire guides (36, 37), respectively, toward the first wire guide (32) and at least partially close, the first passageways (38*a*, 38*b*) between the first wire guide (32) and the second wire guide (36), and between the first wire guide (32) and the third wire guide (37), and wherein the second guide portions (35'*a*, 35'*b*) extend from the second and third wire guides (36, 37), respectively, toward the a fourth wire guide (32') and at least partially close, second passageways (38'*a*, 38'*b*) of the at least one passageway between the fourth wire guide (32') and the second wire guide (37), and between the fourth wire guide (32') and the third wire guide (37).

7. A method for winding a plurality of coils (B) of a wire conductor (W) around respective radial poles (10*c*) of a core (10) of a dynamo electric machine component arranged according to respective radial directions (110*c*), the coils (B) being formed by a plurality of turns (S) of a wire conductor (W), each of the plurality of turns (S) comprising two opposite longitudinal stretches, each of the two opposite longitudinal stretches being positioned in a respective slot (10*a*, 10*b*), and the two opposite longitudinal stretches of each of the plurality of turns being positioned adjacent to respective axial ends (A, A') of the radial pole (10*c*); the method comprising:

forming the turns (S) of the coil (B) by rotating a wire dispenser arm (11) about the respective radial poles (10*c*) to dispense the wire conductor (W);

selectively positioning a first wire guide (32) at a first axial end (A) of the radial pole (10*c*) being wound and moving the first wire guide (32) along a moving direction (132*a*, 132*b*) parallel to the radial direction (110*c*) of the radial pole (10*c*) being wound;

positioning and moving a second wire guide (36) in a first slot (10*a*) adjacent to the radial pole (10*c*) being wound;

positioning and moving a third wire guide (37) in a second slot (10*b*) adjacent to the pole (10*c*) being wound, the second and the third wire guides (36, 37) being positioned relative to the first wire guide (32) so as to form at least one respective passageway (38*a*, 38*b*, 38'*a*, 38'*b*) for the wire conductor (W);

wherein the first, second and third wire guides (32, 36, 37) are configured to move independently of one another; and further comprising:

at least partially closing at least one of the respective passageways (38*a*, 38*b*, 38'*a*, 38'*b*) during winding of the radial pole (10*c*) by at least first and second guide portions (35*a*, 35*b*, 35'*a*, 35'*b*), the first and second guide portions (35*a*, 35*b*, 35'*a*, 35'*b*) including portions that each extend toward one another and being coplanar and arranged to protrude respectively from the second and the third wire guide (36, 37) toward the first wire guide (32), and partially overlapping the radial pole (10*c*) when viewed in an axial direction, such that the wire conductor (W) is prevented from withdrawing into the passageways (38*a*, 38*b*, 38'*a*, 38'*b*) when moving from an edge (36*a*) of the second wire guide (36) to an edge (32*a*) of the first wire guide (32), or from the edge (32*a*) of the first wire guide (32) to an edge (37*a*) of the third wire guide (37), due to a presence of the first and second guide portions (35*a*, 35*b*, 35'*a*, 35'*b*).

8. The method according to claim 7, wherein the step of at least partially closing is carried out by at least a first and a second guide portion (35*a*, 35*b*, 35'*a*, 35'*b*) protruding from at least one of the second and third wire guides (36, 37) and oriented towards the first wire guide (32).

9. The method according to claim 7, wherein the step of at least partially closing is carried out by the first and second guide portions (35*a*, 35*b*, 35'*a*, 35'*b*) protruding from at least one of the second and third wire guides (36, 37) and oriented along a direction substantially orthogonal to the radial direction (110*c*) of the radial pole (10*c*) being wound.

10. The method according to claim 7, wherein the at least one respective passageway forms first passageways, further comprising at least partially closing first passageways (38*a*, 38*b*) defined at opposite sides (L, L') of the pole (10*c*) being wound, respectively, between the first wire guide (32) and the second wire guide (36), and between the first wire guide (32) and the third wire guide (37), by the first guide portions (35*a*, 35*b*) protruding from the second wire guide (36) and the third wire guide (37), respectively.

11. The method according to claim 7, further comprising selectively positioning a fourth wire guide (32') at a second axial end (A') opposite to the first axial end (A) of the radial pole (10*c*) being wound, wherein the at least one respective passageway forms first passageways, and moving the fourth wire guide (32') along the radial direction (110*c*) of the radial pole (10*c*) being wound, and further comprising:

at least partially closing the first passageway (38*a*, 38*b*) defined between the first wire guide (32) and the second wire guide (36), or between the first wire guide (32) and the third wire guide (37), by at least the first guide portion (35*a*, 35*b*) protruding from at least one of the second wire guide (36) and the third wire guide (37);

at least partially closing at least a second passageway (38'*a*, 38'*b*) defined between the fourth wire guide (32') and the second wire guide (36), or between the fourth wire guide (32') and the third wire guide (37), by the second guide portion (35'*a*, 35'*b*) protruding from at least one of the second wire guide (36) and the third wire guide (37).

12. The method according to claim 10, further comprising steps of:

at least partially closing the first passageways (38*a*, 38*b*) by the respective first guide portion (35*a*, 35*b*) protruding from the second and the third wire guide (36, 37) towards the first wire guide (32);

wherein the at least one respective passageway forms second passageways, at least partially closing, the second passageways (38'*a*, 38'*b*) by the respective second guide portion (35'*a*, 35'*b*) protruding from the second and the third wire guide (36, 37) towards the fourth wire guide (32').

\* \* \* \* \*